Figure 1:
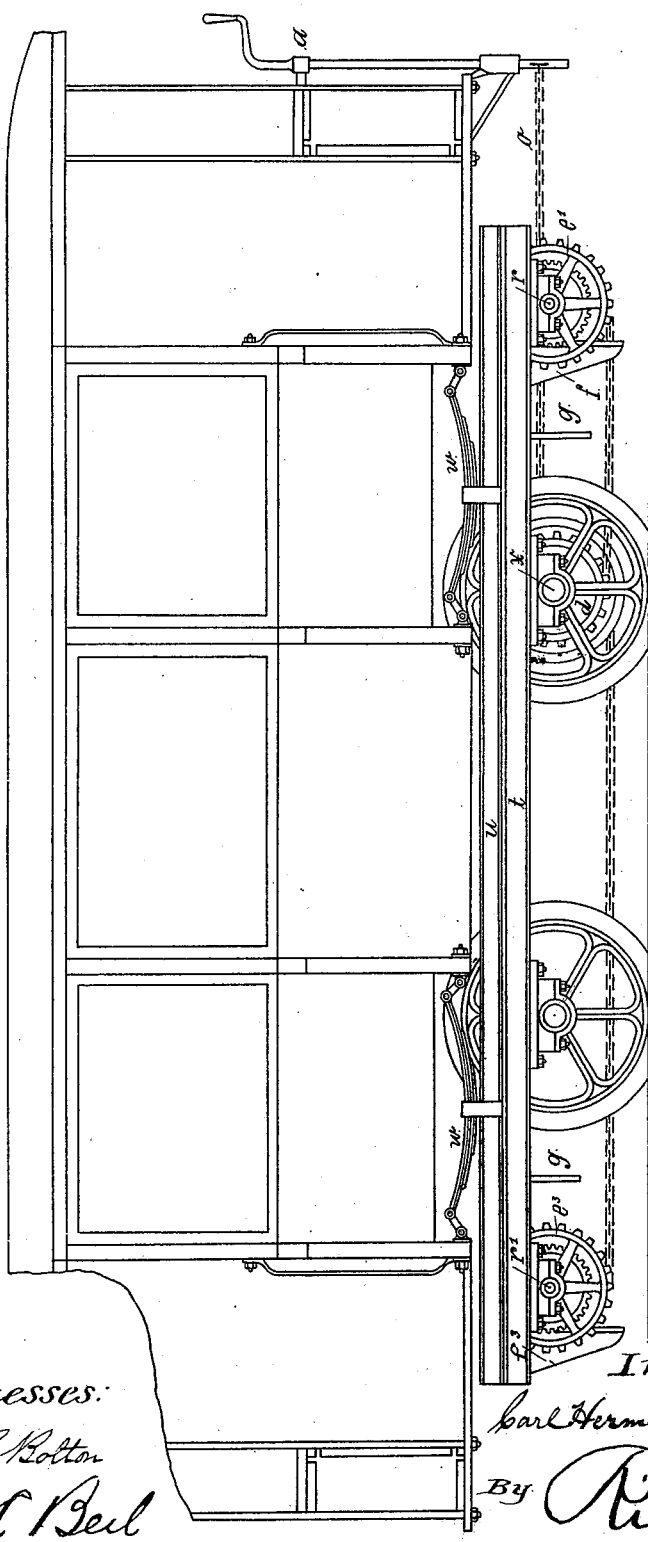

(No Model.) 2 Sheets—Sheet 1.
C. H. O. LEVERKUS.
CAR STARTER AND BRAKE.

No. 518,371. Patented Apr. 17, 1894.

Witnesses:
E. B. Bolton
H. L. Beil

Inventor:
Carl Hermann Otto Leverkus
By Richard
his Attorneys (No Model.) 2 Sheets—Sheet 2.
C. H. O. LEVERKUS.
CAR STARTER AND BRAKE.
No. 518,371. Patented Apr. 17, 1894.
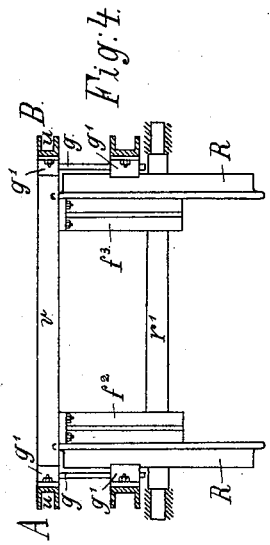
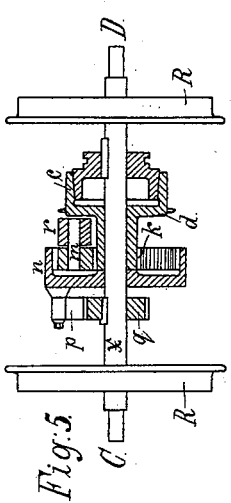
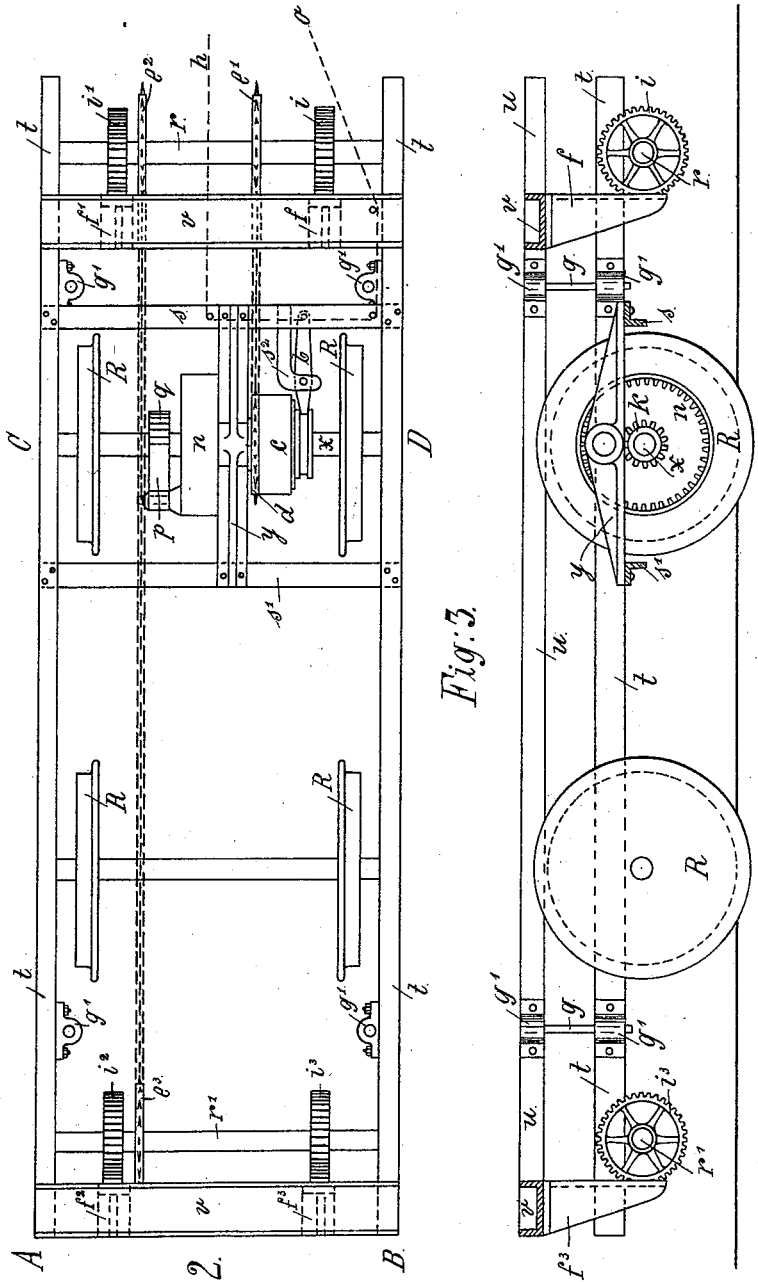

UNITED STATES PATENT OFFICE.

CARL HERMANN OTTO LEVERKUS, OF COLOGNE-ON-THE-RHINE, GERMANY.

CAR STARTER AND BRAKE.

SPECIFICATION forming part of Letters Patent No. 518,371, dated April 17, 1894.

Application filed January 9, 1894. Serial No. 496,232. (No model.)

*To all whom it may concern:*

Be it known that I, CARL HERMANN OTTO LEVERKUS, a subject of the King of Prussia, residing at Cologne-on-the-Rhine, in the Kingdom of Prussia, German Empire, have invented new and useful Improvements in Power-Accumulating Brakes for Tramway-Cars, of which the following is a specification.

This invention relates to a power accumulating brake for tramway cars and it has for its purpose to store up and to utilize again the power, which in braking ordinarily is lost. The tramway cars have been stopped hitherto by brake blocks pressed against the wheels of the vehicle. By this braking the *vis viva* of the running car is completely lost and the starting of the stopped car requires an extraordinary power. I have made an arrangement, by means of which the *vis viva* of the running car is stored up and utilized again in starting the vehicle. I employ the *vis viva* of the car for performing a new work absorbing for the moment entirely the *vis viva*, but rendering afterward the latter profitable again. The body of the tramway car, which is carried by a separate frame, is lifted by the *vis viva* of the vehicle, and held in this position by a suitable device. The pressure of the car body effects then the starting of the car in the desired manner. I have solved thus the problem of the power accumulating brake in an entirely new and peculiar manner. I will proceed to describe hereinafter the construction of a brake acting in this manner.

The invention is illustrated in the accompanying drawings, in which—

Figure 1 is a side view of a tramway car provided with my new braking device. Fig. 2 is a plan view, and Fig. 3 a side view of the brake being in activity. Fig. 4 is a vertical section on the line A—B in Fig. 2 and Fig. 5 a vertical section on the line C—D in Fig. 2.

The body of the tramway car is carried in a springy manner by means of plate springs $w$ by a separate frame $u$ (see Fig. 1); the frame $u$ is movable with respect to the frame $t$ carrying the shafts of the wheels and the whole braking mechanism (see Fig. 3).

The shaft $x$ of the car wheels R carries a loose chain wheel $d$, which by the friction clutch $c$ actuated by the lever $b$ can be turned in the direction of the wheels R (see Figs. 2, 3 and 5); the lever $b$ is movable on an arm $s^2$ fastened to the angle iron $s$. The motion of the chain wheel $d$ is transmitted to the chain wheels $e'$, $e^2$ and $e^3$ carried by the shafts $r$ and $r'$ arranged in the frame $t$ of the under carriage, and revolving thus the said shafts $r$ and $r'$.

To the shafts $r$ and $r'$ are secured the toothed wheels $i$ $i'$ $i^2$ $i^3$ gearing with the racks $f f' f^2 f^3$ firmly fastened to the frame $u$. With the chain wheel $d$ is firmly connected the toothed wheel $k$ revolving by the agency of the toothed wheel $m$, the inside toothed wheel $n$. The wheel $m$ is carried by the jack $y$ supported by the two angle-irons $s$ and $s'$ secured to the frame $t$. The wheel $n$ is provided with a pawl $p$ catching into the toothed wheel $q$ firmly secured to the shaft $x$, when the starting device enters in activity, but sliding on the said wheel at the ordinary movement of the car.

The action of the mechanism is as follows: If the brake is to be applied, the crank $a$ is reversed; by this the lever $b$ is moved sidewise by the chain $o$, so that the friction clutch $c$ is thrown in gear with the chain wheel $d$. The chain wheel $d$ revolves now in the direction of the car wheels R and also, owing to the chain transmission, the chain wheels $e'$ $e^2$ $e^3$ with their shafts $r$ and $r'$. By the latter the toothed wheels $i$ $i'$ $i^2$ $i^3$ are revolved and act on the racks $f f' f^2 f^3$ fastened to the frame $u$ in such a manner, that the latter and in consequence the whole car body are lifted. The *vis viva* of the running car is therefore used for raising the weight of the car, so that the vehicle will be stopped within a very short space, as for performing the said work the *vis viva* of the car is completely consumed. To prevent the car body from displacing sidewise rods $g$ sliding in guides $g'$ of the frame are secured to the car body. For starting the car after the brake has been applied the crank $a$ is turned back disengaging thus the friction clutch; by this the weight of the vehicle begins to act, as by the pressure exerted on the racks $f f' f^2 f^3$ the toothed wheels $i$ $i'$ $i^2$ $i^3$ gearing therewith, and in consequence also the shafts $r$ and $r'$ are revolved. The chain wheels $e^3$ $e^2$ $e'$ connected with each other revolve now also imparting a rotary motion to the chain wheel $d$, which moving loosely on the shaft $y$, revolves in a direction contrary to its former one; but as the car wheel R is allowed to turn only in one direction, the motion of the chain wheel $d$ cannot be communicated directly to the shaft of the car wheels, but a transmission must take place. The toothed wheel $k$ connected with the chain wheel $d$ actuates now the toothed wheel $m$ acting on the inside-toothed wheel $n$ (see Figs. 2 and 5). On the wheel $n$ the pawl $p$ is arranged in such a manner, that in starting the car the pawl catches into the toothed wheel $q$, firmly connected with the shaft $x$ of the car wheels R. The motion of the chain wheel $d$ is transmitted therefore to the car wheels R in such a manner, that they revolve in the direction the car is traveling. In this way the power, which was necessary for raising the car, is utilized for facilitating the starting.

The height, to which the car is lifted, is regulated by giving the chain wheels $d$, $e'$ $e^2$ $e^3$ and the toothed wheels $i$ $i'$ $i^2$ $i^3$ the suitable sizes. The length of the height may however scarcely exceed twenty centimeters.

The power stored up by the lifting of the car, is sufficient for advancing the car automatically about one meter; it is obvious, that by this a very considerable amount of power is saved.

I claim—

1. In combination, in a car starter apparatus, the chain wheel $d$, the shaft $x$ loosely carrying the same, the clutch $c$ arranged to release and engage the said chain wheel with the axle, the chain wheels $e'$ $e^2$ and $e^3$, the shafts $r$ $r'$ carrying the same, the connections from the chain wheel $d$ to the train of wheels $e'$ $e^2$ and $e^3$, the gear wheels carried by the shafts $r$ $r'$, the movable frame $u$ movable vertically in relation to the truck frame, the racks on said frame engaging the gear wheels whereby the frame $u$ will be lifted in stopping the car by throwing in the clutch and the means for transmitting the falling movement of the frame $u$ to the car axles consisting of the toothed wheel fixed on the car axle, the pawl engaging the same, the toothed wheel $n$ carrying said pawl and the gearing for operating said toothed wheel consisting of the pinion $k$ on the chain wheel $d$ and the pinion $m$ between the same and the toothed pawl carrier $n$, substantially as described.

2. In combination, in a car starter apparatus, the truck frame, the vertically movable frame $u$ carrying the car body, the elevating means between the truck frame and the frame $u$, the driving connections engaging the car axle for operating the elevating means, the clutch for throwing the driving connections into and out of engagement with the car axle and the transmitting devices between the driving connections and the car axle for transmitting the falling movement of the car body and frame $u$ to the said car axle to start the car, substantially as described.

In testimony whereof I have signed my name to this specification in the presence of two subscribing witnesses.

CARL HERMANN OTTO LEVERKUS.

Witnesses:
WILHELM HEINRICH WALTHER,
FRITZ SCHRÖDER.